United States Patent
Kato

(10) Patent No.: US 10,656,347 B2
(45) Date of Patent: May 19, 2020

(54) CONNECTOR ATTACHED OPTICAL FIBER UNIT AND OPTICAL CONNECTOR BOOT WITH PROTECTION TUBE

(71) Applicant: FUJIKURA LTD., Tokyo (JP)

(72) Inventor: Seiji Kato, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 14/688,028

(22) Filed: Apr. 16, 2015

(65) Prior Publication Data

US 2015/0346435 A1 Dec. 3, 2015

(30) Foreign Application Priority Data

May 29, 2014 (JP) .................................. 2014-111242

(51) Int. Cl.
  *G02B 6/38* (2006.01)
  *G02B 6/44* (2006.01)

(52) U.S. Cl.
  CPC ......... *G02B 6/3887* (2013.01); *G02B 6/3826* (2013.01); *G02B 6/3885* (2013.01); *G02B 6/443* (2013.01); *G02B 6/4435* (2013.01)

(58) Field of Classification Search
  None
  See application file for complete search history.

(56) References Cited

U.S. PATENT DOCUMENTS

| | | | | |
|---|---|---|---|---|
| 3,395,244 A | * | 7/1968 | Koehler | H01R 13/562 174/135 |
| 4,652,082 A | * | 3/1987 | Warner | G02B 6/3829 385/78 |
| 4,988,159 A | * | 1/1991 | Turner | G02B 6/3834 385/33 |
| 5,037,175 A | * | 8/1991 | Weber | G02B 6/3878 385/76 |

(Continued)

FOREIGN PATENT DOCUMENTS

| | | |
|---|---|---|
| JP | 57-177110 A | 10/1982 |
| JP | 8-122567 A | 5/1996 |

(Continued)

OTHER PUBLICATIONS

"F12 Type Connectors for optical fiber ribbons (MT connectors)" of JIS C 5981; pp. 1-4.

(Continued)

*Primary Examiner* — Andrew Jordan
(74) *Attorney, Agent, or Firm* — Osha Liang LLP

(57) ABSTRACT

A connector attached optical fiber unit includes: an MT optical connector which includes a joining end surface formed at a front end of the MT optical connector and a hollow portion opened to a rear end surface opposite to the joining end surface; a tubular boot which includes a front end insertion portion inserted and fixed into to the hollow portion and a tube attachment portion formed at a rear end portion of the tubular boot, the tubular boot extending to a rear side from the MT optical connector; a protection tube (Continued)

into which the tube attachment portion is inserted and to which the tube attachment portion is fixed; and a plurality of optical fibers which include tip portions inserted and fixed into the MT optical connector and are accommodated inside the boot and the protection tube.

15 Claims, 12 Drawing Sheets

(56) References Cited

U.S. PATENT DOCUMENTS

| | | | | |
|---|---|---|---|---|
| 5,519,799 | A * | 5/1996 | Murakami | G02B 6/3825 385/66 |
| 6,435,732 | B1 * | 8/2002 | Asao | G02B 6/387 385/78 |
| 6,454,464 | B1 * | 9/2002 | Nolan | G02B 6/3807 385/60 |
| 6,652,156 | B2 * | 11/2003 | Shinagawa | G02B 6/3871 385/77 |
| 6,695,488 | B2 * | 2/2004 | Grabbe | G02B 6/245 385/77 |
| 6,960,030 | B2 * | 11/2005 | Seo | G02B 6/4478 385/76 |
| 7,407,331 | B2 * | 8/2008 | Momotsu | G02B 6/4471 385/135 |
| 8,562,225 | B2 * | 10/2013 | Kato | B29C 45/0025 264/1.25 |
| 8,702,323 | B2 * | 4/2014 | Nhep | G02B 6/3887 385/86 |
| 8,746,987 | B2 * | 6/2014 | Choi | G02B 6/3887 385/78 |
| 9,025,917 | B2 * | 5/2015 | Aoki | G02B 6/32 385/33 |
| 9,638,869 | B2 * | 5/2017 | Nhep | G02B 6/3869 |
| 9,645,324 | B2 * | 5/2017 | Hikosaka | G02B 6/3887 |
| 2001/0036343 | A1 * | 11/2001 | Okochi | G02B 6/3877 385/92 |
| 2002/0037139 | A1 * | 3/2002 | Asao | G02B 6/387 385/78 |
| 2002/0186932 | A1 * | 12/2002 | Barnes | G02B 6/3846 385/78 |
| 2003/0095754 | A1 * | 5/2003 | Matsumoto | G02B 6/3885 385/86 |
| 2004/0005123 | A1 | 1/2004 | Seo et al. | |
| 2004/0121646 | A1 * | 6/2004 | Iamartino | G02B 6/3829 439/445 |
| 2007/0025665 | A1 * | 2/2007 | Dean, Jr. | G02B 6/3869 385/78 |
| 2007/0127871 | A1 * | 6/2007 | Kurosawa | G02B 6/3887 385/69 |
| 2007/0160327 | A1 * | 7/2007 | Lewallen | G02B 6/3817 385/53 |
| 2009/0257718 | A1 | 10/2009 | Nishimura et al. | |
| 2009/0304335 | A1 * | 12/2009 | Marcouiller | G02B 6/3869 385/78 |
| 2011/0064358 | A1 * | 3/2011 | Nishimura | G02B 6/4214 385/33 |
| 2011/0207360 | A1 * | 8/2011 | Jordan | H01R 9/032 439/350 |
| 2011/0229085 | A1 * | 9/2011 | Bradley | G02B 6/3885 385/78 |
| 2012/0106899 | A1 * | 5/2012 | Choi | G02B 6/3887 385/81 |
| 2012/0257858 | A1 * | 10/2012 | Nhep | G02B 6/3889 385/78 |
| 2013/0343706 | A1 | 12/2013 | Droesbeke et al. | |
| 2014/0010500 | A1 * | 1/2014 | Saito | G02B 6/3885 385/70 |
| 2014/0037252 | A1 * | 2/2014 | Hikosaka | G02B 6/3887 385/81 |
| 2014/0341512 | A1 * | 11/2014 | Hikosaka | G02B 6/3857 385/81 |
| 2015/0346435 | A1 * | 12/2015 | Kato | G02B 6/3887 385/78 |
| 2017/0336573 | A1 * | 11/2017 | Nhep | G02B 6/3869 |

FOREIGN PATENT DOCUMENTS

| | | |
|---|---|---|
| JP | 2003-177279 A | 6/2003 |
| JP | 2004-77736 A | 3/2004 |
| JP | 2005-99477 A | 4/2005 |
| JP | 2009-230105 A | 10/2009 |
| JP | 2014-013309 A | 1/2014 |

OTHER PUBLICATIONS

Japanese Office Action of JP 2014-111242, dated Oct. 21, 2014.
Notice of Allowance of JP 2014-111242, dated Mar. 24, 2015.

* cited by examiner

CONNECTOR ATTACHED OPTICAL FIBER UNIT AND OPTICAL CONNECTOR BOOT WITH PROTECTION TUBE

BACKGROUND OF THE INVENTION

Field of the Invention

The present invention relates to a connector attached optical fiber unit in which a plurality of optical fibers having tip portions inserted into and fixed to an MT optical connector pass inside a boot attached to the MT optical connector, and an optical connector boot which is suitably used for the boot of the connector attached optical fiber unit.

Priority is claimed on Japanese Patent Application No. 2014-111242, filed on May 29, 2014, the content of which is incorporated herein by reference.

Description of Related Art

An MT optical connector (based on F12 type optical connector of ESC 5981 and MT: Mechanically Transferable) is known as a multi-core optical connector which can cover the end of an optical fiber tape (a tape-like multi-core optical fiber such as an optical fiber tape core wire) so as to be connectable by a connector.

The MT optical connector (hereinafter, also referred to as an MT connector) includes a plastic body of which the outline is formed in an approximately rectangular plate shape. In the MT connector, a butting-joining front end surface (hereinafter, referred to as a joining end surface), a window hole which is recessed from one of the connector, and a boot hole which extends from the window hole to the connector rear side and is opened to a connector rear end surface are formed.

Moreover, in the MT connector, a plurality of fiber positioning holes which penetrate a front wall portion positioned at the front side from the window hole in a frontward-rearward direction in a connector and which are micro-pores opened to the joining end surface and the window hole are formed.

When the MT connector is attached to the optical fiber tape tip portion, the optical fiber tape tip portion is inserted into the window hole from the connector rear side via the boot hole and is adhesively fixed to the body by adhesive filling the window hole. The tip portion of the optical fiber tape is inserted from the boot hole in a state where a coating material is removed in advance and a plurality of bare optical fibers are exposed, and the bare optical fibers are inserted into the fiber positioning holes of the connector front wall portion one by one.

In addition, during an operation in which the MT connector is attached to the optical fiber tape tip portion, an operation is widely performed in which a tubular boot externally inserted into the optical fiber tape is inserted into the boot hole of the MT connector and is adhesively fixed to the body by the adhesive filling the window hole. A portion which protrudes rearward from the MT connector is provided in the boot.

The boot is made of a resin having flexibility such as elastomer. When a bending force is applied to the optical fiber tape, the portion of the boot which protrudes from the MT connector toward the rear side is bent according to the flexibility thereof, and thus, the optical fiber tape in the vicinity of the connector rear end surface is prevented from being bent to a small bending radius below an allowable bending radius at which the optical transmission characteristics of the optical fiber tape can be maintained.

In general, the boot hole of the MT connector is an angular hole having a rectangular cross-sectional shape which is thin and long in the longitudinal direction of the rectangular connector rear end surface. Generally, the outer circumferential surface of the boot is formed in a flat tubular shape which approximately coincides with the inner circumferential surface of the boot hole (for example, refer to Japanese Unexamined Patent Application, First Publication No. 2005-099477). A through hole inside the boot is formed to extend in a slender flat cross-section along a cross-sectional longitudinal direction of the boot (hereinafter, referred to as the boot width direction). The optical fiber tape passes inside the boot so that the cross-sectional longitudinal direction of the optical fiber tape is arranged in the cross-sectional longitudinal direction of the through hole inside the boot.

In addition, the boot with the flat tubular shape is also disclosed in Japanese Unexamined Patent Application, First Publication No. 2009-230105.

SUMMARY OF THE INVENTION

A bending direction of an optical fiber tape is limited to the thickness direction, that is, is limited to a direction in which one of both surfaces of the optical fiber tape becomes the inner circumferential side and the other becomes the outer circumferential side. In a boot of the related art which is attached to an MT connector and has a flat tubular shape and the optical fiber tape which passes inside the boot, the bending direction is limited to the thickness direction.

For example, when the MT connector is used in a circuit substrate, in order to suppress the protrusion height from the substrate, it is considered to support one surface of the MT connector with the substrate in the direction along the surface of the substrate. However, in this case, bending or drawing of the optical fiber extending from the MT connector supported by the substrate in the direction along the surface of the substrate is largely limited.

In addition, Japanese Unexamined Patent Application, First Publication No. 2009-230105 discloses a configuration in which a single-core optical fiber (an optical fiber in which a bare fiber is coated by a resin) exposed by removing the resin coating of the optical fiber tape passes inside the boot. However, in the boot having a flat tubular shape disclosed in Japanese Unexamined Patent Application, First Publication No. 2009-230105, since the bending direction is limited to the thickness direction, it is not possible to bend the boot and the optical fiber inside the boot in the boot width direction.

The present invention is made in consideration of the above-described circumstances, and an object thereof is to provide a connector attached optical fiber unit capable of bending the boot attached to the MT connector and the optical fiber passing inside the boot in the boot width direction with respect to the MT connector, and an optical connector boot capable of being suitably used as the boot of the connector attached optical fiber unit.

The present invention adopts the following means in order to solve the above-described problems.

According to a first aspect of the present invention, there is provided a connector attached optical fiber unit including: an MT optical connector which includes a joining end surface formed at a front end of the MT optical connector and a hollow portion opened to a rear end surface opposite to the joining end surface; a tubular boot which includes a front end insertion portion inserted and fixed into to the hollow portion, a tube attachment portion formed at a rear end portion of the tubular boot, and a flexible tubular body portion extending between the front end insertion portion and the tube attachment portion, the tubular boot extending to a rear side from the MT optical connector; a protection tube into which the tube attachment portion is inserted and to which the tube attachment portion is fixed; and a plurality of optical fibers which include tip portions inserted and fixed into the MT optical connector and are accommodated inside the boot and the protection tube. Also, a front fiber hole, which is opened to a front end surface of the front end insertion portion and communicates with a front end of an inner hole of the tubular body portion, is formed on the front end insertion portion, and notch portions, which are recessed from an outer circumferential surface or an inner circumferential surface of the tubular body portion, are formed at intervals from each other at a plurality of locations in a center axis direction of the tubular body portion in a plurality of circumferential locations including both sides of the tubular body portion in a right-left direction of a boot coincident with an interval direction of a pair of guide pin holes of the MT optical connector.

The boot may further include an abutting wall portion which is formed between the front end insertion portion and the tubular body portion, protrudes from both sides of the front end insertion portion in an extension direction of the tubular body portion and in an up-down direction perpendicular to the right-left direction in the tubular boot, and abuts the rear end surface of the MT optical connector, and the front fiber hole penetrates the front end insertion portion and the abutting wall portion, and communicates with the front end of the inner hole of the tubular body portion.

The size in the right-left direction of a range from a rear end of the front end insertion portion of the boot to a rear end of the tubular body portion may be less than the size in the right-left direction of the front end insertion portion.

A tape-like portion which collectively coats a plurality of the optical fibers in a tape shape with a resin coating material may be accommodated in the hollow portion of the MT optical connector, and a portion which extends from the tape-like portion of the optical fiber to the rear side may be accommodated in the tubular body portion of the tubular boot and the protection tube.

The notch portions of the tubular boot may be formed only on both sides in the boot right-left direction of the tubular body portion.

The tube attachment portion of the tubular boot includes a tubular wall portion continuous from the rear end of the tubular body portion, and a slipping-off prevention projection which protrudes from the outer circumferential surface of the tubular wall portion and increases the pull-out resistance of the protection tube into which the tubular wall portion is inserted with respect to the tubular wall portion.

The flat cross-sectional front fiber hole which has the right-left direction in the tubular boot as the cross-sectional longitudinal direction thereof may be formed at a plurality of locations in the extension direction of the tubular body portion and in the up-down direction perpendicular to the right-left direction in the boot in the front end insertion portion of the boot.

According to a second aspect of the present invention, there is provided an optical connector boot attached to an MT optical connector, including: a flexible tubular body portion into which a plurality of optical fibers are inserted; a front end insertion portion which is provided on a front side of the tubular body portion, and is inserted and fixed into a hollow portion opened to a rear end surface opposite to a joining end surface of a front end of the MT optical connector; and a tubular attachment portion which is formed on a rear side of the tubular body portion and is inserted and fixed into a protection tube, a protection tube accommodating the optical fibers extending from a rear end of the tubular body portion. Also, in the front end insertion portion, a cross-sectional outline perpendicular to a center axis of the tubular body portion is formed in a rectangular shape, and a front fiber hole which communicates with the front side of an inner hole of the tubular body portion is formed, and notch portions which is recessed from an outer circumferential surface or an inner circumferential surface of the tubular body portion are formed at intervals from each other at a plurality of locations in a center axis direction of the tubular body portion in a plurality of circumferential locations including both sides in a right-left direction in a boot coincident with a cross-sectional longitudinal direction of the front end insertion portion of the tubular body portion.

The optical connector boot may further include an abutting wall portion which is formed between the front end insertion portion and the tubular body portion, protrudes from both sides of the front end insertion portion in an extension direction of the tubular body portion and in an up-down direction perpendicular to the right-left direction in the boot, and abuts the rear end surface of the MT optical connector, in which the front fiber hole may penetrate the front end insertion portion and the abutting wall portion, and may communicate with the front end of the inner hole of the tubular body portion.

The size in the right-left direction of a range from a rear end of the front end insertion portion of the boot to a rear end of the tubular body portion may be less than the size in the right-left direction of the front end insertion portion.

The notch portions of the boot may be formed only on both sides in the boot right-left direction of the tubular body portion.

The tube attachment portion of the boot may include a tubular wall portion continuous from the rear end of the tubular body portion, and a slipping-off prevention projection which protrudes from the outer circumferential surface of the tubular wall portion and increases the pull-out resistance of the protection tube into which the tubular wall portion is inserted with respect to the tubular wall portion.

The flat cross-sectional front fiber hole which has the right-left direction in the boot as the cross-sectional longitudinal direction thereof may be formed at a plurality of locations in the extension direction of the tubular body portion and in the up-down direction perpendicular to the right-left direction in the boot in the front end insertion portion.

According to the connector attached optical fiber unit of the aspects of the present invention, it is possible to bend the tubular body portion of the boot attached to the MT connector along with the plurality of optical fibers accommodated inside the tubular body portion at least in the right-left direction in the boot. In addition, the connector attached optical fiber unit can accommodate and protect the plurality of optical fibers (single-core optical fibers) using the protection tube.

In general, the MT connector includes a configuration in which an angular hole having a rectangular cross-sectional shape which is thin and long in an interval direction (connector width direction) of a pair of guide pin holes is opened to the rear end opposite to the joining end surface of the front end of the MT connector, as the hollow portion. In the optical connector boot according to the aspects of the present invention, when the front end insertion portion is inserted into and fixed in the angular hole (hollow portion) opened to the rear end surface of the MT connector, that is, in the angular hole having the rectangular cross-sectional shape which is thin and long in the connector width direction, it is possible to bend the tubular body portion along with the plurality of optical fibers accommodated inside the tubular body portion in at least the right-left direction in the boot. Moreover, in the optical connector boot, it is possible to simply attach the protection tube to the tube attachment portion of the rear end portion of the optical connector boot. This optical connector boot can be used as the boot of the connector attached optical fiber unit according to the present invention.

DETAILED DESCRIPTION OF THE INVENTION

First Embodiment

A first embodiment of the present invention will be described with reference to FIGS. 1 to 6.

Figure 1:
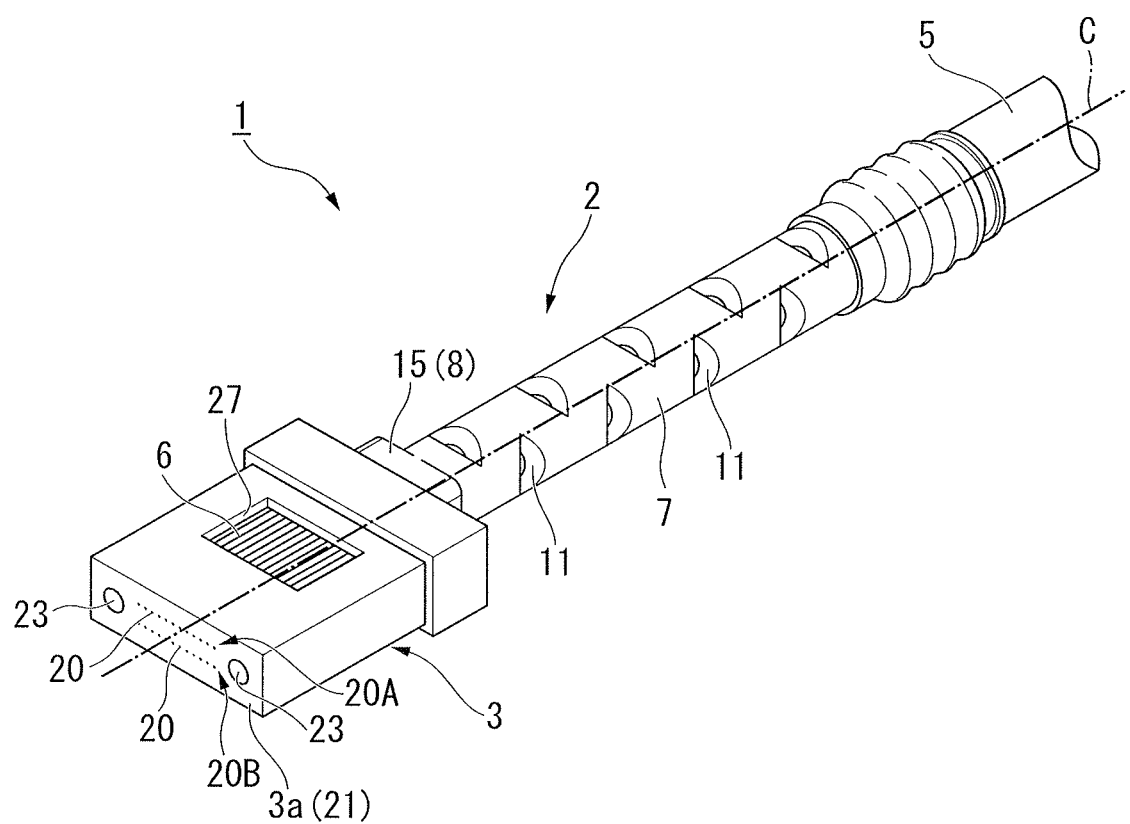
FIG. 1 is a perspective view showing a first embodiment of a connector attached optical fiber unit according to the present invention.
Figure 2A:
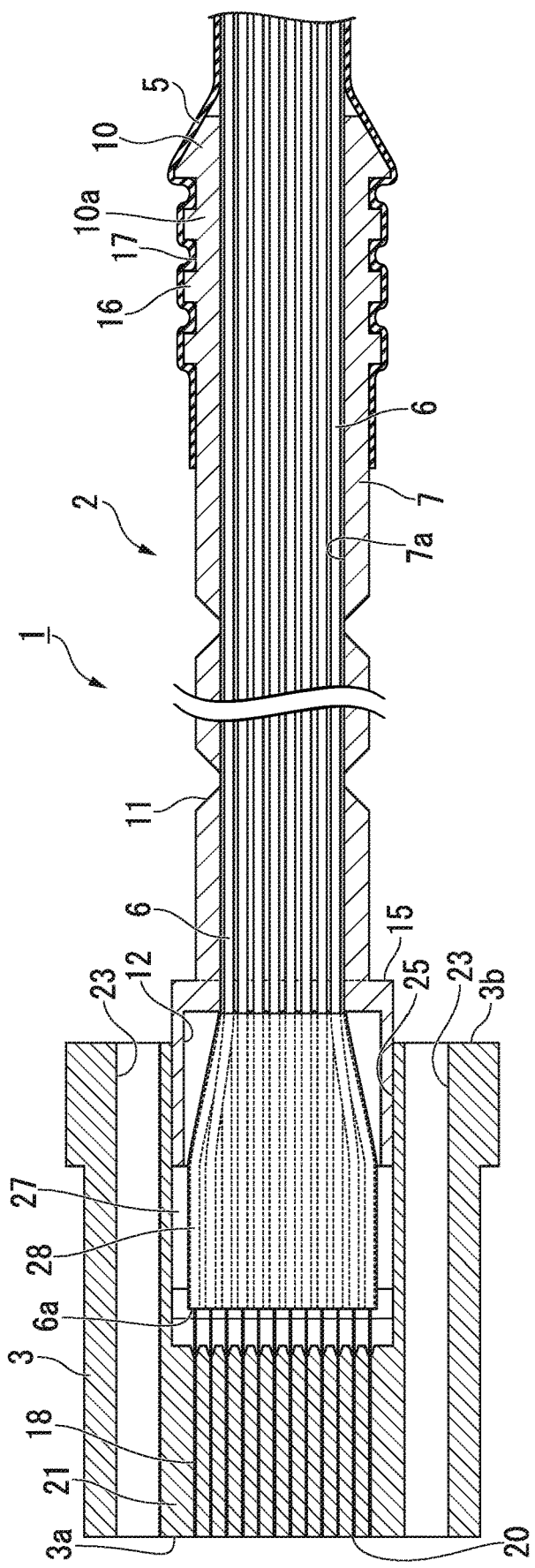
FIG. 2A is a plan cross-sectional view showing the structure of the connector attached optical fiber unit of FIG. 1.
Figure 2B:
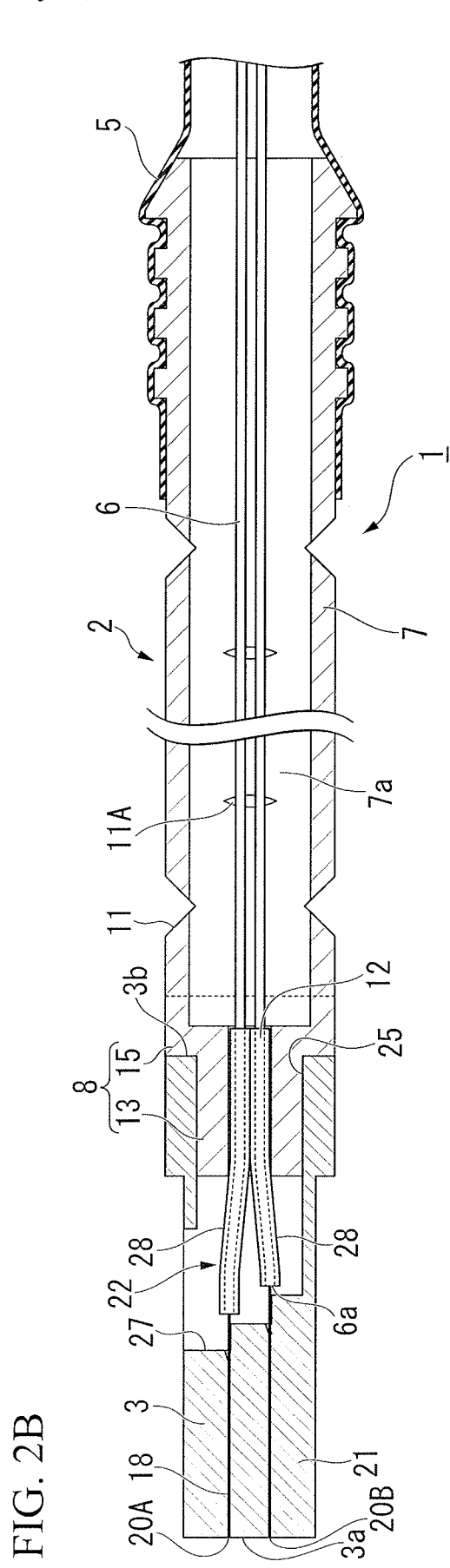
FIG. 2B is a side cross-sectional view showing the structure of the connector attached optical fiber unit of FIG. 1.

As shown in FIGS. 1 to 2B, a connector attached optical fiber unit 1 of the present embodiment includes an MT optical connector 3 (hereinafter, also referred to a "MT connector"), a tubular optical connector boot 2 (hereinafter, simply referred to as a "boot") which has a front end portion inserted into and fixed to the MT connector 3 and is attached to the MT connector 3, and a protection tube 5 which is externally inserted and fixed to the rear end portion of the boot 2. The protection tube 2 may be formed of a single piece, may envelop the tube attachment portion 10, and may be disposed radially outside and attached to the tube attachment portion 10 of the tubular boot 2, circumferentially surrounding a plurality of optical fibers 6, and extending flexibly with the plurality of optical fibers 6 beyond the tubular boot 2 from the rear end portion of the tubular boot 2. A radial direction of the tubular body portion 7 is perpendicular to both a center axis direction of the tubular body portion and an azimuthal direction of the tubular body portion relative to the center axis direction.

The connector attached optical fiber unit 1 is configured to accommodate a plurality of optical fibers 6, which include tip portions inserted into and fixed to the MT connector 3 and extend to the rear side opposite to a joining end surface 3a of the front end from the MT connector 3, inside the boot 2 and the protective tube 5.

In this embodiment, the optical fiber wire 6 is an optical fiber. Hereinafter, the optical fiber wire 6 is also referred to as an "optical fiber wire".

Moreover, the optical fiber wire 6 is not limited being embodied as the optical fiber wire. For example, the optical fiber wire 6 may be a coated single-core optical fiber, in which a coating is attached to the outer circumferential surface of a bare optical fiber, such as a single-core optical fiber core wire.

The boot 2 is an integral molded article which is formed of a flexible material such as elastomer.

Figure 3:
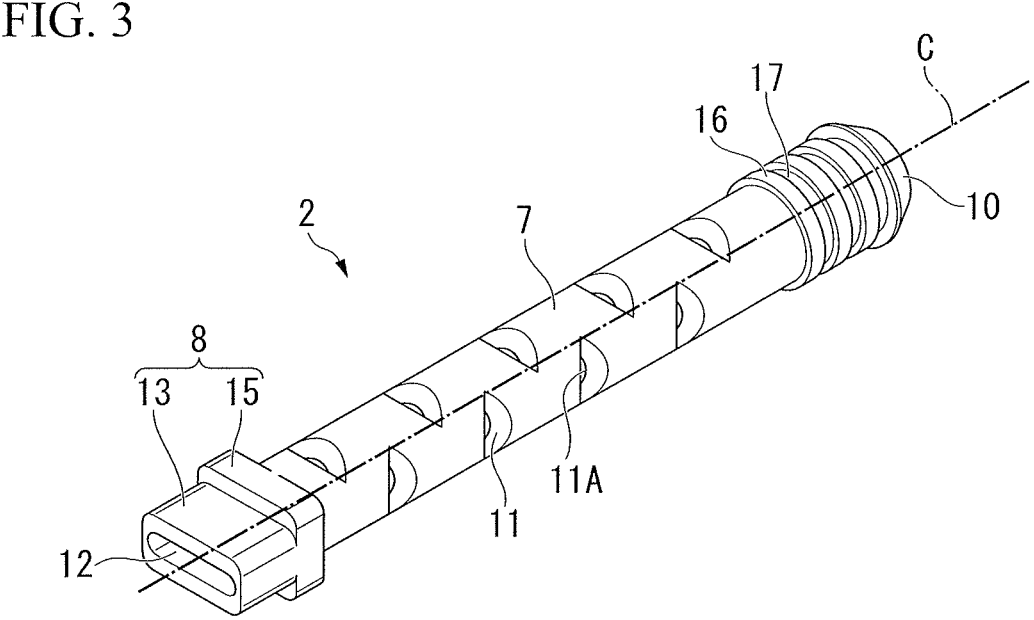
FIG. 3 is a perspective view showing an optical connector boot according to the present invention.
Figure 4A:
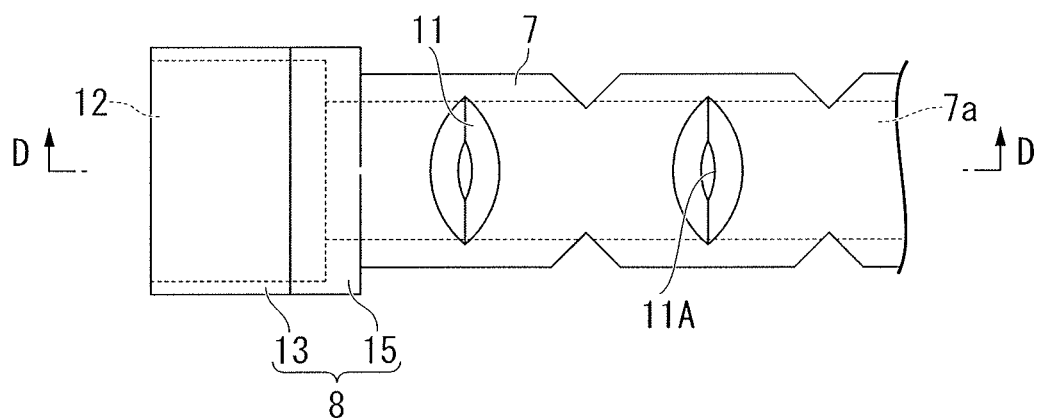
FIG. 4A is a main portion plan view of the optical connector boot shown in FIG. 3.
Figure 4B:
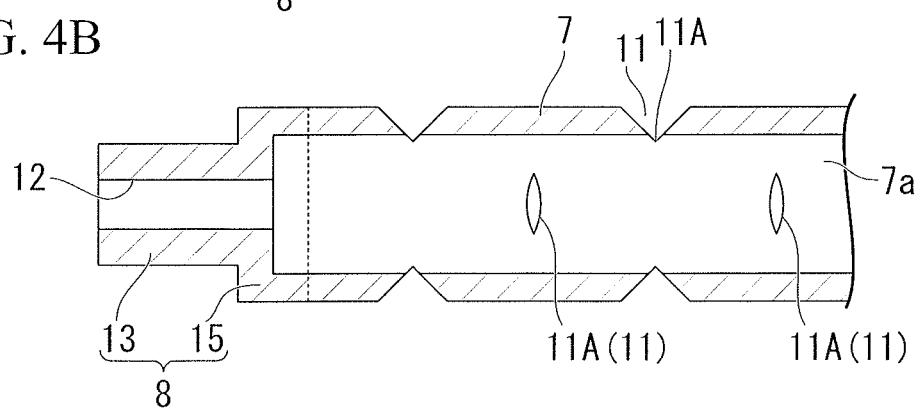
FIG. 4B is a cross-sectional view taken along D-D of the optical connector boot shown in FIG. 4A.

As shown in FIGS. 3 to 4B, the boot 2 includes a flexible tubular body portion 7, a front end insertion portion 13 provided on the front side of the tubular body portion 7, and a tube attachment portion 10 provided on the rear side of the tubular body portion 7. The front end insertion portion 13 forms the front end portion of the boot 2. The tube attachment portion 10 forms the rear end portion of the boot 2.

The tubular body portion 7 is formed in an approximately cylindrical shape. In the tubular body portion 7, a plurality of notch portions 11 recessed from the outer circumferential surface of the tubular body portion 7 are formed so as to be arranged in a direction along center axis C.

The notch portion 11 of the shown example is formed in a groove shape which extends along the center axis C of the tubular body portion 7 and in a direction perpendicular to the radius having the center axis C as the center thereof. Specifically, the notch portion 11 of the shown example is formed in a tapered shape in which the groove width is gradually decreased from the outer circumferential surface of the tubular body portion 7 toward the inner side of the tubular body portion 7.

Moreover, the notch portion 11 of the shown example is formed to penetrate the thickness of the tubular body portion 7. A hole portion 11A which is opened to an inner hole 7a which is the internal space of the tubular body portion 7 is formed on the bottom surface of the notch portion 11. As seen in the notch portions 11 in FIGS. 3-4B, inner hole 7*a* of the tubular body portion 7 may have a circular cross-section perpendicular to a center axis C of the tubular body portion 7.

As shown in FIGS. 2A and 2B, the MT connector 3 includes a boot hole 25 which is opened to the center portion of a rear end surface 3*b* of the MT connector, and a hollow portion 22 having a window hole 27 which is recessed from one surface of the plate shaped MT connector 3. The boot hole 25 is formed to extend from the connector rear end surface 3*b* toward the connector front side. The front end of the boot hole 25 communicates with the window hole 27.

The hollow portion 22 is formed between a pair of guide pin holes 23 which extend in the frontward-rearward direction of the MT connector 3 and are formed to be parallel with each other. In the MT connector 3, the interval direction between the pair of guide pin holes 23 formed to be separated from each other is referred to as a width direction (connector width direction). An angular hole, which has a rectangular cross-section which is thin and long in the connector width direction and extends in the frontward-rearward direction of the connector, is formed in the boot hole 25 of the MT connector of the shown example.

As shown in FIGS. 3 to 4B, a head portion 8 is provided on the front side of the tubular body portion 7, and the head portion includes a front end insertion portion 13 which is inserted to the boot hole 25 and inserted into and fixed to the MT connector 3, and an abutting wall portion 15 which abuts the connector rear end surface 3*b*.

In the front end insertion portion 13, the cross-sectional outline (hereinafter, simply referred to as a cross-sectional outline) perpendicular to the center axis C of the tubular body portion 7 is formed in a rectangular shape. Specifically, the cross-sectional outline of the front end insertion portion 13 has a rectangular shape which is approximately coincident with the cross-section outline (the cross-sectional outline perpendicular to the center axis of the boot hole 25) of the boot hole 25. The cross-sectional outer sizes of the front end insertion portion 13 are approximately coincident with the cross-sectional outer sizes of the boot hole 25. Accordingly, the front end insertion portion 13 inserted into the boot hole 25 of the MT connector is positioned in the cross-sectional direction perpendicular to the center axis of the boot hole 25 by the inner circumferential surface of the boot hole 25. Further, an outer circumference of a cross section of the tubular body portion perpendicular to the center axis of the tubular body portion measured immediately adjacent to the front end portion i nthe right-left direction is smaller than a circumference of a cross-sectional outline of the front end insertion portion perpendicular to the center axis of the tubular body portion.

As shown in FIGS. 2A to 3, a front fiber hole 12 into which the plurality of optical fiber wires 6 are inserted is formed in the head portion 8. The front fiber hole 12 is opened to the front end surface of the front end insertion portion 13, penetrates the front end insertion portion 13 and the abutting wall portion 15 in the frontward-rearward direction, and communicates with the front end of the inner hole 7*a* of the tubular body portion 7.

In addition, hereinafter, in the boot 2, in a state where the entire portion of the rear side from the head portion 8 extends rearward in a straight line from the MT connector 3, a direction which is coincident with the connector width direction is defined as a right-left direction, and a direction which is perpendicular to the right-left direction in a cross-section perpendicular to the extension direction of the tubular body portion 7 is defined as an up-down direction.

As shown in FIGS. 2A to 3, the size in the right-left direction of the abutting wall portion 15 is coincident with the size in the rectangular cross-sectional longitudinal direction (right-left direction) of the front end insertion portion 13. Moreover, the abutting wall portion 15 protrudes from both sides of the front end insertion portion 13 in the up-down direction. In the abutting wall portion 15, the cross-sectional outline perpendicular to the center axis C of the tubular body portion 7 is formed in a rectangular shape, more specifically, in a rectangular shape in which the size in the up-down direction is smaller than the size in the right-left direction.

In addition, the front fiber hole 12 is formed in a slender flat shape in the rectangular cross-sectional longitudinal directions of the front end insertion portion 13 and the abutting wall portion 15.

The size in the right-left direction of the right-left direction in the boot of the tubular body portion 7 is defined so as not to exceed the size in the right-left direction of the front end insertion portion 13. The outer diameter of the tubular body portion 7 of the boot 2 of the shown example is the same as the size in the rectangular cross-sectional short-length direction of the abutting wall portion 15, and is smaller than the size in the rectangular cross-sectional longitudinal direction of the abutting wall portion 15.

The abutting wall portion 15 and the tubular body portion 7 do not cover both side regions in the connector width direction via the boot hole 25 in the MT connector rear end surface 3*b*. Accordingly, the abutting wall portion 15 and the tubular body portion 7 do not disturb engagement between a clip which holds the butted MT connector and applies a butting force and the MT connector rear end surface 3*b*.

The tube attachment portion 10 includes a tubular wall portion 10*a* which is continuously formed from the rear end of the tubular body portion 7, and a protruding portion 17 (slipping-off preventive projection) which protrudes from the outer circumferential surface of the tubular wall portion 10*a*. A plurality of the protruding portions 17 are provided in the direction of the center axis C. The protruding portions 17 and recessed portions 16 between the protruding portions 17 adjacent in the direction of the center axis are disposed so as to be alternatively arranged in the direction of the center axis C. Each protruding portion 17 is formed so as to have a height which can suitably engage with the tube 5. The protruding portions 17 and the recessed portions 16 have a function which increases the pull-out resistance of the front end portion of the protection tube 5, which is externally inserted into the tubular wall portion 10*a*, with respect to the tubular wall portion 10*a*, and stably maintains the connection state of the front end portion of the protection tube 5 with respect to the tubular wall portion 10*a*.

In a front wall portion 21 positioned on the front side from the window hole 27 of the MT connector 3, a plurality of fiber positioning holes 20, into which clad portions 18 (bare optical fibers) of the optical fiber wires 6 are inserted, are formed to penetrate the front wall portion 21 in the frontward-rearward direction in the connector. The fiber positioning holes 20 are formed from the joining end surface 3*a* of the MT connector 3 to the rear end surface of the front wall portion 21 facing the window hole 27.

As shown in FIG. 1, in the front wall portion 21 of the MT connector 3, the fiber positioning holes 20 are formed at twenty-four locations. The fiber positioning holes 20 are disposed to be divided into a plurality of hole rows, that is, into a first hole row 20A and a second hole row 20B so that the optical fiber wires 6 are inserted into the fiber positioning holes in one row of twelve optical fiber wires. Each hole row is formed so that the plurality of (twelve in FIG. 1) fiber positioning holes 20 are arranged side by side in the connector width direction.

Moreover, the rear end portion of the front wall portion 21 is formed so that the second hole row 20B side further protrudes toward the connector rear side than the first hole row 20A side.

As shown in FIGS. 2A and 2B, the bare optical fibers 18, in which the coating material of the tip of the optical fiber wire 6 is removed and the optical fiber wire is lead out, are inserted into each fiber positioning hole 20 one by one. The first positioning hole 20 positions the bare optical fiber 18 of the tip of the optical fiber wire 6 with respect to the guide pin hole 23 with high accuracy.

The tip of the bare optical fiber 18 inserted into the fiber positioning hole 20 is positioned on the joining end surface 3a of the MT connector 3.

The tip of the coating portion, in which the bare optical fiber 18 of the optical fiber wire 6 is covered by the coating material 6a, is disposed at the region in the front side of the front end insertion portion 13 of the boot 2 inserted into the boot hole 25 in the hollow portion 22 of the MT connector 3.

As shown in FIGS. 2A and 2B, a tape-like portion 28 which collectively coats the optical fiber wires 6 (coating portion) in a tape shape with a resin coating material, are formed in the plurality of (twelve in FIGS. 2A and 2B) optical fiber wires 6 in which the bare optical fibers 18 are inserted into the fiber positioning holes 20 positioned in the same row of the MT connector 3. Hereinafter, the resin coating material of the tape-like portion 28 which collectively coats the plurality of optical fiber wires 6 is also referred to as a collective coating material.

Figure 5:
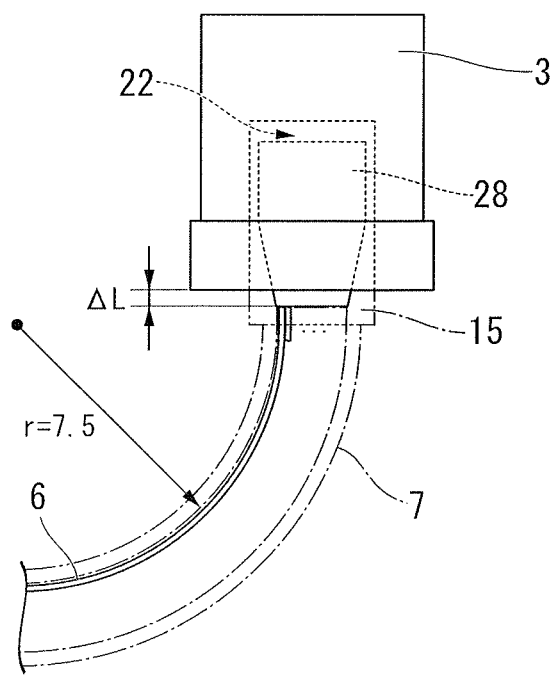
FIG. 5 is a view showing a state where the connector attached optical fiber unit shown in FIG. 1 is bent at the optical connector boot.
Figure 6:
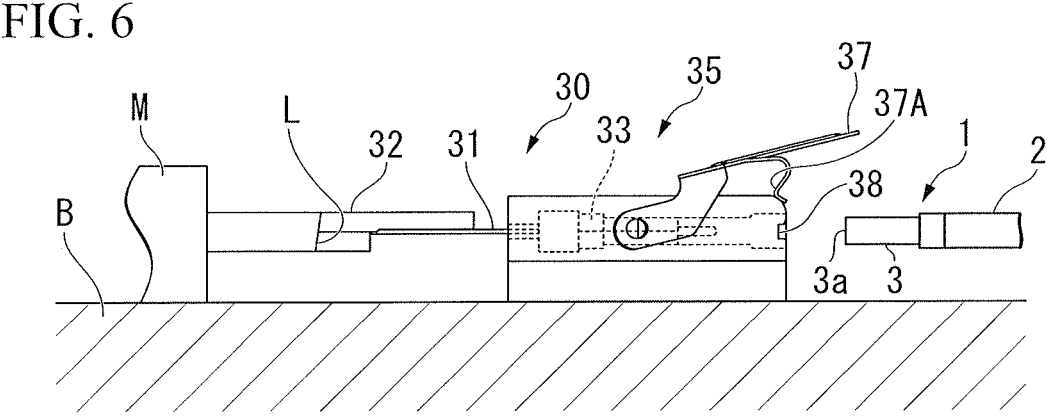
FIG. 6 is a side view showing a use example of the connector attached optical fiber unit shown in FIG. 1.

In FIGS. 2A, 2B, and 5, in the connector attached optical fiber unit 1, the portion corresponding to the range of the tape-like portion 28 from the rear end to the center portion in the frontward-rearward direction along the longitudinal direction of the optical fiber wire 6 is inserted into the front fiber hole 12 of the front end insertion portion 13 of the boot 2. In the portion of the tape-like portion 28 which extends from the front end of the front end insertion portion 13 of the boot to the front side, the front end of the portion is disposed in the vicinity of the front wall portion 21 of the MT connector 3 and is accommodated in the hollow portion 22.

Moreover, the tape-like portion 28 is inserted into the hollow portion 22 of the MT connector 3 in a state where the tape-like portion protrudes from the boot hole 25 to the rear side of the connector by □L. In FIGS. 2A, 2B, and 5, the rear end of the tape-like portion 28 is positioned in the front fiber hole 12 of the front end insertion portion 13 of the boot 2.

As shown in FIGS. 1 to 2B, in the present embodiment, twenty-four optical fiber wires 6 are inserted into the single boot 2. Accordingly, two tape-like portions 28 are disposed in the hollow portion 22 of the MT connector 3 and the front fiber hole 12 of the boot 2 in a state where two tape-like portions overlap with each other in two upper and lower stages.

As shown in FIGS. 2A and 2B, in the connector attached optical fiber unit 1, the tip surfaces of the coating material 6a in the coating portion of the optical fiber wire 6 are arranged on the front end surface of the collective coating material of the tape-like portion 28.

However, the coating portion of the optical fiber wire 6 may protrude from the front end of the tape-like portion 28 to the front side.

The tape-like portion 28 is adhesively fixed to the MT connector 3 by adhesive (not shown) filling (injected to) the hollow portion 22 from the window hole 27 of the MT connector 3. As a result, the optical fiber wires 6 are fixed to the MT connector 3 via the collective coating material of the tape-like portion 28.

Moreover, in order to fix the tape-like portion 28 to the MT connector 3, the front end insertion portion 13 of the boot 2 is adhesively fixed to the MT connector 3 by adhesive filling (injected to) the hollow portion 22 from the window hole 27.

The bare optical fiber 18 inserted into the fiber positioning hole 20 is adhesively fixed to the inner surface of the fiber positioning hole 20 by the adhesive.

In the hollow portion 22 of the MT connector 3, the region in the front side of the front end insertion portion 13 of the boot 2 inserted into the boot hole 25 is filled with the adhesive injected to the hollow portion 22 from the window hole 27 of the MT connector 3, and the adhesive slightly enters the front fiber hole 12 of the boot 2. However, the gap of the front fiber hole 12 of the boot 2 through which the adhesive passes is decreased by the tape-like portion 28 inserted into the front fiber hole 12. Accordingly, even when the adhesive enters the front end portion of the front fiber hole 12, the adhesive does not enter the rear side of the front end portion. The state where the portion of the tape-like portion 28 positioned at the rear side of the front end portion of the front fiber hole 12 is not adhesively fixed to any location is secured.

As the connector attached optical fiber unit according to the present embodiment, a configuration which does not include the tape-like portion 28 may be adopted. In this case, the optical fiber wires 6 inserted into the hollow portion 22 of the MT connector 3 are directly fixed to the MT connector 3 adhesively by the adhesive filling (injected to) the hollow portion 22 from the window hole 27 of the MT connector 3.

For example, the tape-like portion 28 prevents the optical fiber wires 6 passing through the front fiber hole 12 of the boot 2 from being bent at a small bending radius which influences the optical transmission characteristics due to the repeated bending or the like of the tubular body portion 7.

When the tubular body portion 7 of the boot 2 is bent in the state where the tubular body portion extends backward in a straight line from the boot hole 25 of the MT connector 3, the optical fiber wires 6 inserted into the tubular body portion 7 also are bent by following the tubular body portion 7. In this case, a tension force is applied to the optical fiber wire (hereinafter, referred to as an outer circumferential side optical fiber wire during bending) positioned at the outer circumferential side of the bending among the optical fiber wires 6 inserted into the tubular body portion 7. The tension force also is transmitted to the portion positioned on the front side of the tubular body portion 7 of the optical fiber wire 6. On the other hand, when the bent tubular body portion 7 extends backward in a straight line from the boot hole 25 of the MT connector 3, a pressing force may be applied to the portion of the outer circumferential side optical fiber wire which is inserted into the front fiber hole 12 during bending, from the rear side portion. In this case, the tape-like portion 28 prevents the portion of the outer circumferential side optical fiber wire which is inserted into the front fiber hole 12 during the bending from being bent (curved) through slight bending deformation due to the pressing force from the rear side. The tape-like portion 28 distributes the pressing force which is applied to the optical fiber wires 6 configuring the tape-like portion 28 from the rear side, and prevents the specific optical fiber wire 6 from being bent at a small bending radius which influences the optical transmission characteristics.

As shown in FIGS. 2A and 2B, the size (the inner diameter of the inner hole 7a in the tubular body portion 7 in the shown example) in the right-left direction of the inner surface of the tubular body portion 7 in the boot 2 is slightly smaller than the size in the right-left direction of the front fiber hole 12. The distance between the fiber positioning holes 20 of both ends of the hole rows in the MT connector 3 is larger than the size in the right-left direction of the inner surface of the tubular body portion 7 in the boot 2.

The portion, which does not adhere to any portion in the rear side of the portion of the tape-like portion 28 adhering to the MT connector 3 or the front end insertion portion 13 of the boot 2, has a tapered shape in which the size in the connector width direction is gradually decreased toward the rear side of the connector by smooth bending deformation. The rear end portion of the tape-like portion 28 is bent and deformed so that the cross-section perpendicular to the frontward-rearward direction in the connector is in an arc shape. The bending deformation of the tape-like portion 28 is gradually decreased from the rear end of the tape-like portion 28 toward the front side. The above-described bending deformation is not generated in the portion of the tape-like portion 28 on the front side of the front end insertion portion 13 of the boot, and the cross-section perpendicular to the frontward-rearward direction in the connector becomes flat.

The tapered portion of the tape-like portion 28 widely distributes the pressing force from the rear side to the tape-like portion 28, and the pressing force is absorbed due to the elasticity of the tape-like portion 28. The configuration of the tapered portion of the tape-like portion 28 is suitably used to prevent the optical fiber wires 6 from being significantly bent and being bent with slight bending deformation.

Moreover, in FIGS. 2A and 2B, the configuration in which the rear end of the tape-like portion 28 is disposed in the front fiber hole 12 is exemplified. However, as the connector attached optical fiber unit, a configuration may be also adopted in which the tape-like portion 28 protrudes from the front fiber hole 12 to the front end portion of the inner hole 7a of the tubular body portion 7.

Figure 7A:
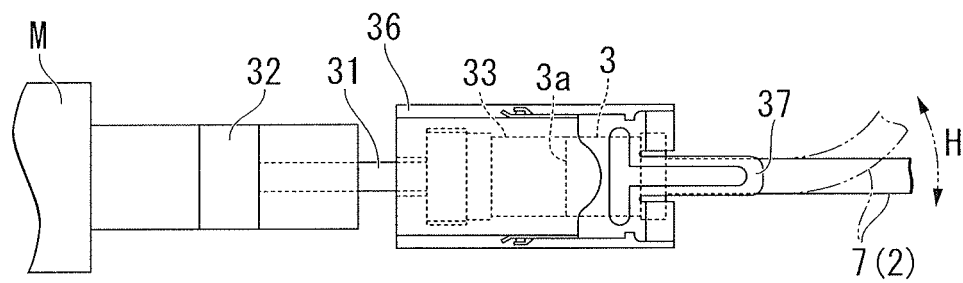
FIG. 7A is a plan view showing a state where the connector attached optical fiber unit shown in FIG. 6 is connected.
Figure 7B:
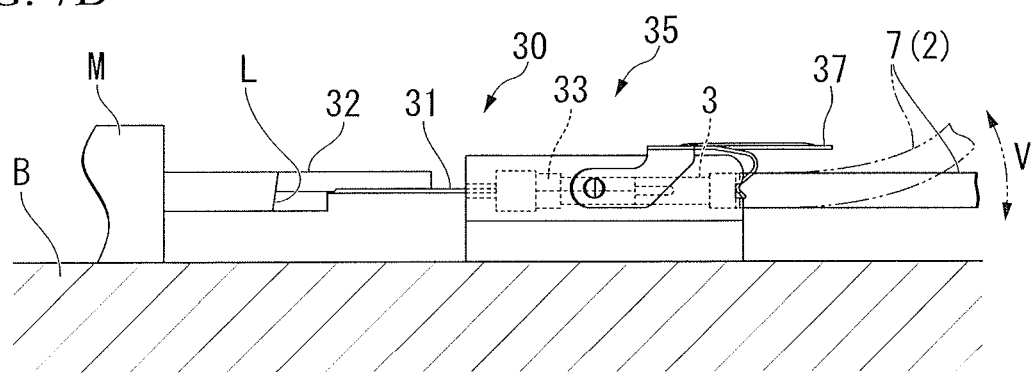
FIG. 7B is a side view showing a state where the connector attached optical fiber unit shown in FIG. 6 is connected.

For example, this connector attached optical fiber unit 1 is used in an optical connector receptacle disclosed in Japanese Unexamined Patent Application, First Publication No. 2003-177279. Therefore, with reference to FIGS. 6 to 7B, the operation will be described according to a case where the connector attached optical fiber unit 1 is used in an optical connection component 30 of a module M (hereinafter, referred to as a "laser module") which includes a light-emitting element such as a semiconductor laser (LD) mounted on a circuit substrate B or a light-receiving element such as a photodiode as the main component thereof.

In the optical connection component 30, a fiber array 32 connected to the laser module M is assembled to one end in the longitudinal direction of the optical fiber 31, and the optical connector 33 connected to the connector attached optical fiber unit 1 according to the present invention is assembled to the other end in the longitudinal direction. The fiber array 32 is connected to a connection end surface L of the laser module M. The optical connector 33 of the other side of the optical connection component 30 is assembled in an optical connector receptacle 35 which is disposed so as to be close to the laser module M on the circuit substrate B and is mounted thereto.

The optical connector receptacle 35 includes a housing 36, and a clip 37 which is rotatably supported with respect to the housing 36, and accommodates and holds the optical connector 33 in the housing 36.

The optical connector 33 and the connector attached optical fiber unit 1 are butted in the optical connector receptacle 35. When the optical connector and the connector attached optical fiber unit are connected to each other, the clip 37 moves to the pressing position, and a pressing piece 37A is engaged with and held to engagement recesses 38 disposed on both sides of a ferrule insertion opening.

In the case of the optical fiber wires bundled in a tape shape in the related art, only the bending in the vertical direction with respect to the circuit substrate B is allowable. In contrast, in the case of the connector attached optical fiber unit 1 according to the present invention, not only the bending in the vertical direction V but also the bending in the horizontal direction H is allowable by deforming the notch portions 11 formed on the surface of the tubular body portion 7 of the boot 2.

According to the boot 2, since the plurality of notch portions 11 are disposed on the side surface of the tubular body portion 7, it is possible to easily bend the tubular body portion 7 in the direction in which the notch portions 11 are arranged. Accordingly, even when the connector attached optical fiber unit 1 is assembled, it is possible to easily bend the boot 2 portion.

In this case, since the protection tube 5 is connected to overlap with only the tube attachment portion 10 on the base end side of the boot 2, it is possible to decrease the region, in which the bending stiffness generated due to the overlapping of the protection tube and the tube attachment portion is increased, to the minimum.

Moreover, the size in the rectangular cross-sectional short-length direction of the abutting wall portion 15 of the boot 2 is formed to be larger than the size in the rectangular cross-sectional short-length direction of the front end insertion portion 13. Accordingly, when the front end insertion portion 13 is inserted into the boot hole 25 of the MT connector 3, the abutting wall portion 15 and the base end surface of the MT connector 3 abut each other, and thus, it is possible to easily position the boot 2 with respect to the MT connector 3.

In addition, since the sizes in the rectangular cross-sectional longitudinal directions of the front end insertion portion 13 and the abutting wall portion 15 of the boot 2 are the same as each other, when a guide pin (not shown) is inserted into the guide pin hole 23 of the MT connector 3, the front end insertion portion 13 is not an obstacle in the assembly thereof.

Figure 8:
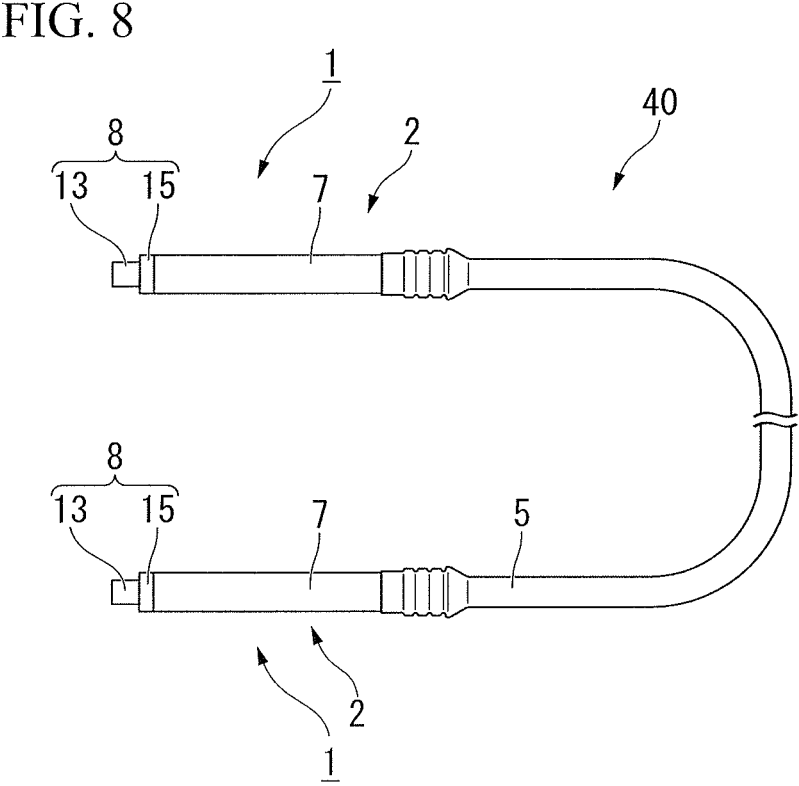
FIG. 8 is a plan view showing another embodiment of the connector attached optical fiber unit shown in FIG. 1.

Moreover, as shown in FIG. 8, the connector attached optical fiber units 1 may be disposed on both ends of a cable 40. In this case, even when the circuit substrates on which the optical connection components are mounted overlap with each other at short intervals in the up-down direction, it is possible to suitably connect the optical connection components on the substrates via the cable 40, and it is possible to secure a larger mounting space.

Second Embodiment

Figure 9:
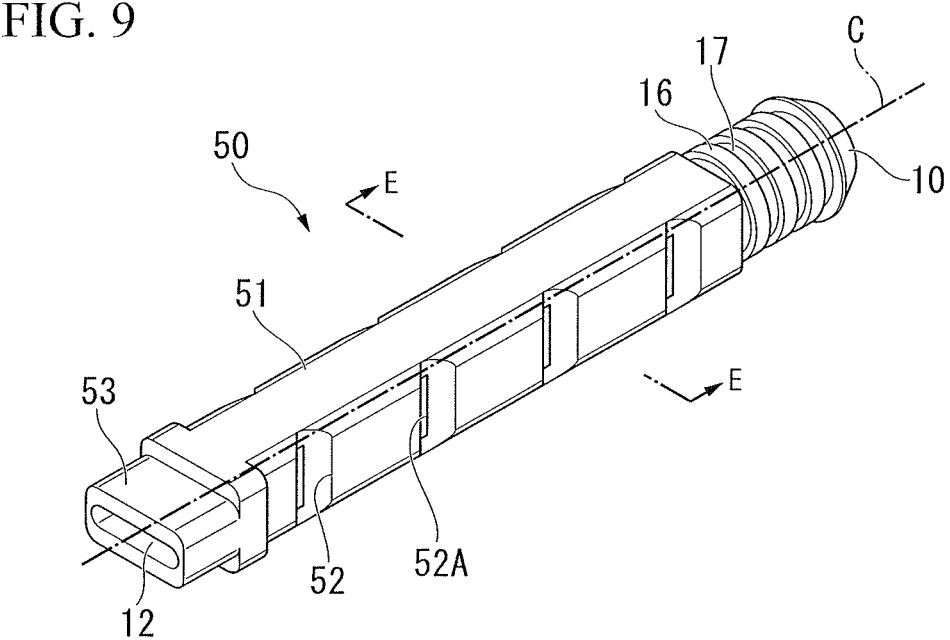
FIG. 9 is a perspective view showing a second embodiment of the optical connector boot according to the present invention.

Next, a second embodiment will be described with reference to FIGS. 9 to 10B.

In addition, the same reference numerals are assigned to the same components as in the above-described first embodiment, and descriptions thereof are omitted.

Differences between the second embodiment and the first embodiment are that a tubular body portion 51 of an optical connector boot 50 according to the present embodiment is formed in a square cylindrical shape, and the notch portions 52 are disposed on only the side surfaces of the tubular body portion 51 of the rectangular cross-sectional longitudinal direction side of the front end insertion portion 13.

Figure 10A:
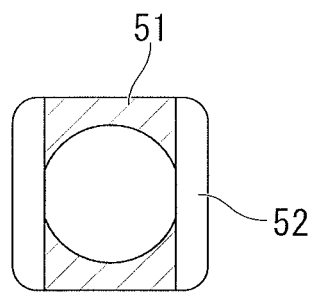
FIG. 10A is a cross-sectional view taken along E-E of the optical connector boot shown in FIG. 9.

As shown in FIG. 10A the cross-sectional shape with respect to the center axis C of the tubular body portion 51 is formed in a square. Accordingly, a hole portion 52A formed by the notch portion 52 becomes a rectangular shape.

A head portion 53 has the same configuration as the front end insertion portion 8 of the boot 2 according to the first embodiment, and the portion corresponding to the abutting wall portion 15 is integrated with the tip of the tubular body portion 51.

According to the optical connector boot 50, since the notch portions 52 are disposed on only the side surfaces of the tubular body portion 51 in the rectangular cross-sectional longitudinal direction side in the front end insertion portion 13, the bending with respect to the side surface sides of the tubular body portion 51 in which the notch portions 52 are not disposed is prevented. Accordingly, when the connector attached optical fiber unit is assembled, it is possible to suitably prevent floating of the connector attached optical fiber unit from the circuit substrate (not shown).

Figure 10B:
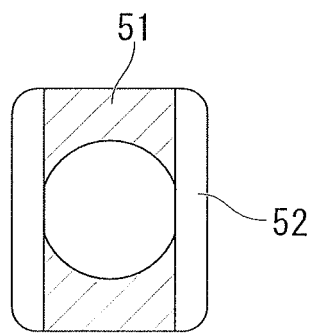
FIG. 10B is a view corresponding to the cross-sectional taken along E-E of the optical connector boot according to another embodiment.

Moreover, as shown in FIG. 10B, the cross-sectional shape of the tubular body portion 51 with respect to the center axis C may be a rectangular shape.

Third Embodiment

Figure 11:
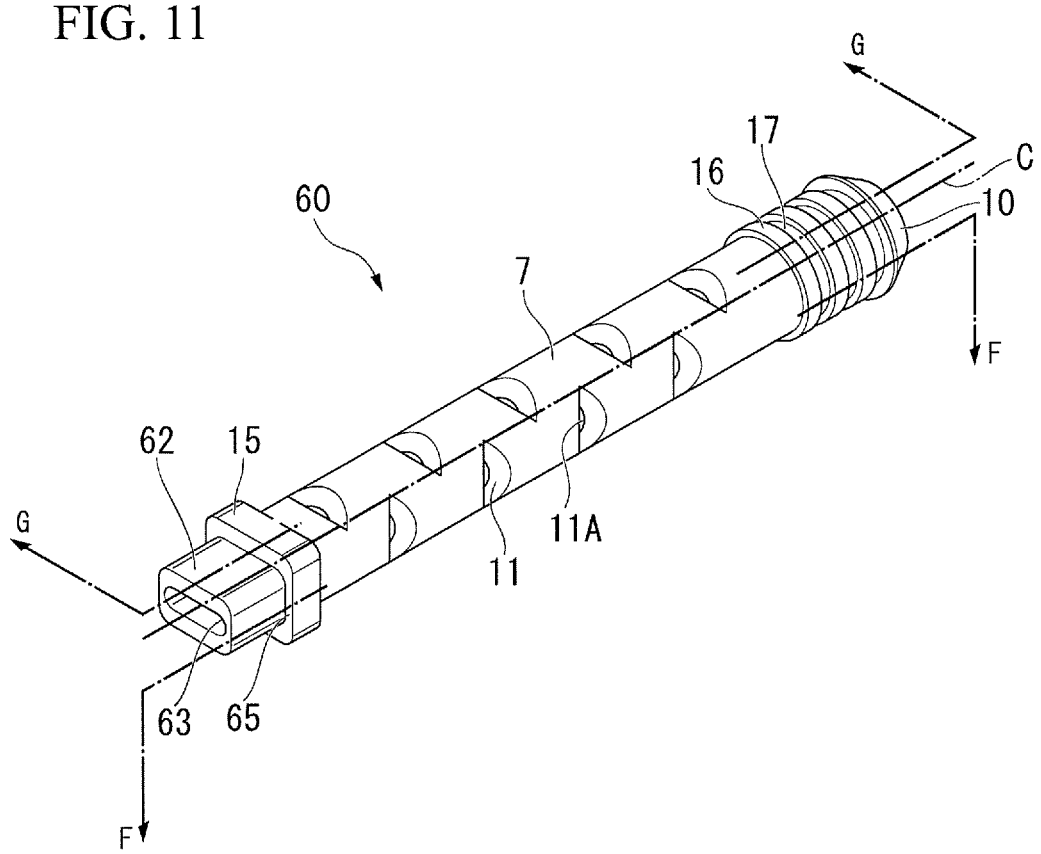
FIG. 11 is a perspective view showing a third embodiment of the optical connector boot according to the present invention.
Figure 12A:
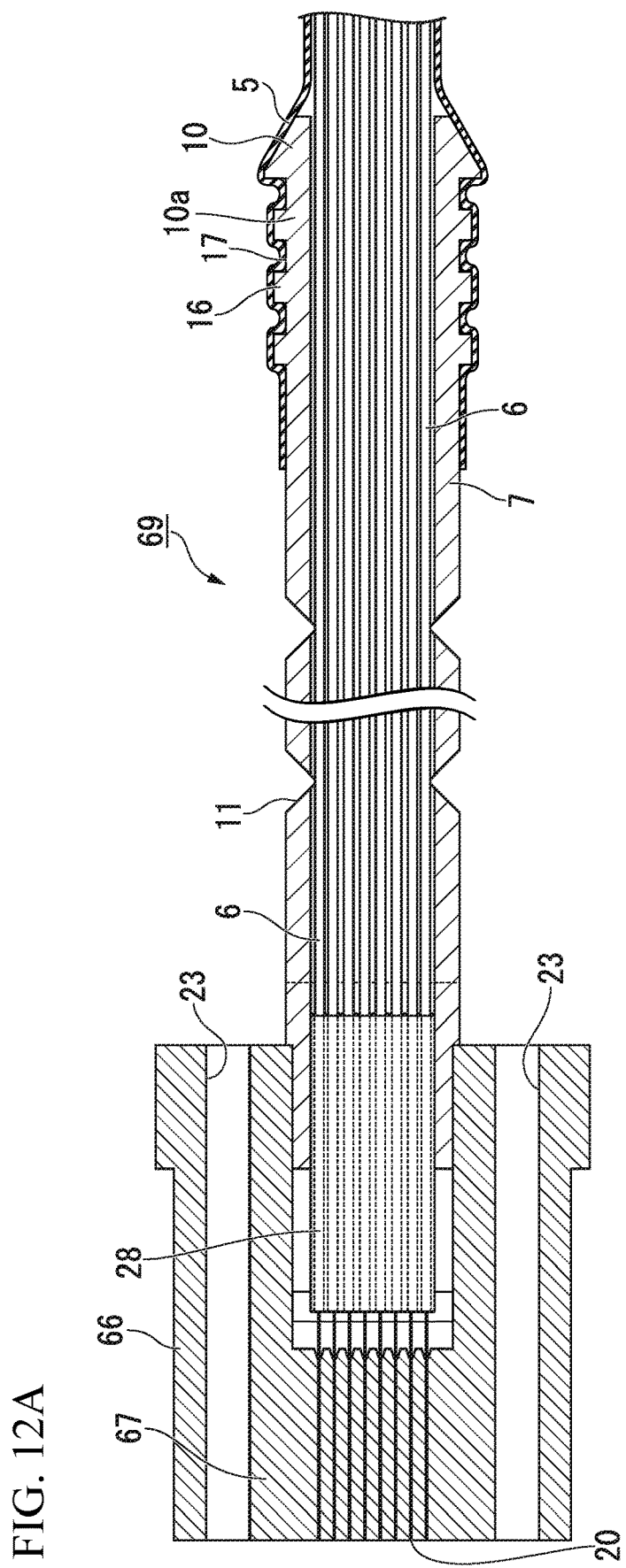
FIG. 12A is a cross-sectional view taken along F-F of the optical connector boot shown in FIG. 11.
Figure 12B:
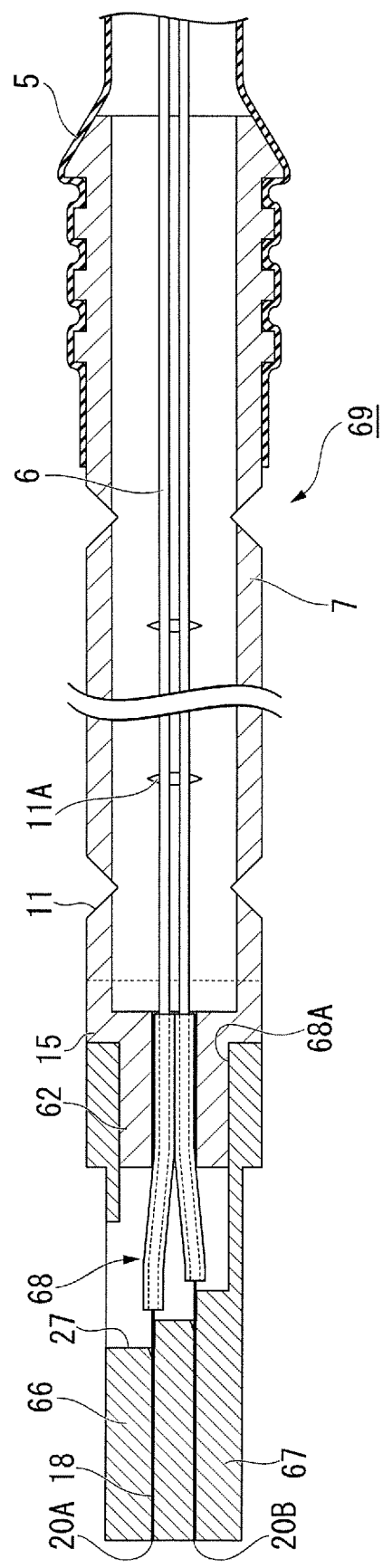
FIG. 12B is a cross-sectional view taken along G-G of the optical connector shown in FIG. 11.

Next, a third embodiment will be described with reference to FIGS. 11 to 12B.

Moreover, the same reference numerals are assigned to the same components as in the above-described embodiments, and descriptions thereof are omitted.

Differences between the third embodiment and the first embodiment are that the optical connector boot 60 according to the present embodiment is formed to be used not for twelve cores but for eight cores.

The length in the rectangular cross-sectional longitudinal direction of the front end insertion portion 62 is shorter than the length in the rectangular cross-sectional longitudinal direction of the front end insertion portion 13 in the boot 2 according to the first embodiment. Similarly, also in the front fiber hole 63, the size in the rectangular cross-sectional longitudinal direction of the front end insertion portion is formed to be smaller than the size of the front fiber hole 12.

On the other hand, the outline of the abutting wall portion 15 is the same as that of the boot 2 according to the first embodiment. Accordingly, a step 65 is formed not only in the rectangular cross-sectional short-length direction but also in the rectangular cross-sectional longitudinal direction between the front end insertion portion 62 and the abutting wall portion 15.

In a front wall portion 67 of an optical connector ferrule 66, the fiber positioning holes 20 are disposed so that the optical fiber wires 6 are inserted in one row of eight. A hollow portion 68 and a boot hole 68A of the optical connector ferrule 66 are formed to be smaller than the hollow portion 22 and the boot hole 25 of the MT connector 3 according to the first embodiment.

According to the optical connector boot 60 and the connector attached optical fiber unit 69, it is possible to exert the same effects as in the boot 2 and the connector attached optical fiber unit 1 according to the first embodiment as specifications for eight cores.

Fourth Embodiment

Figure 13:
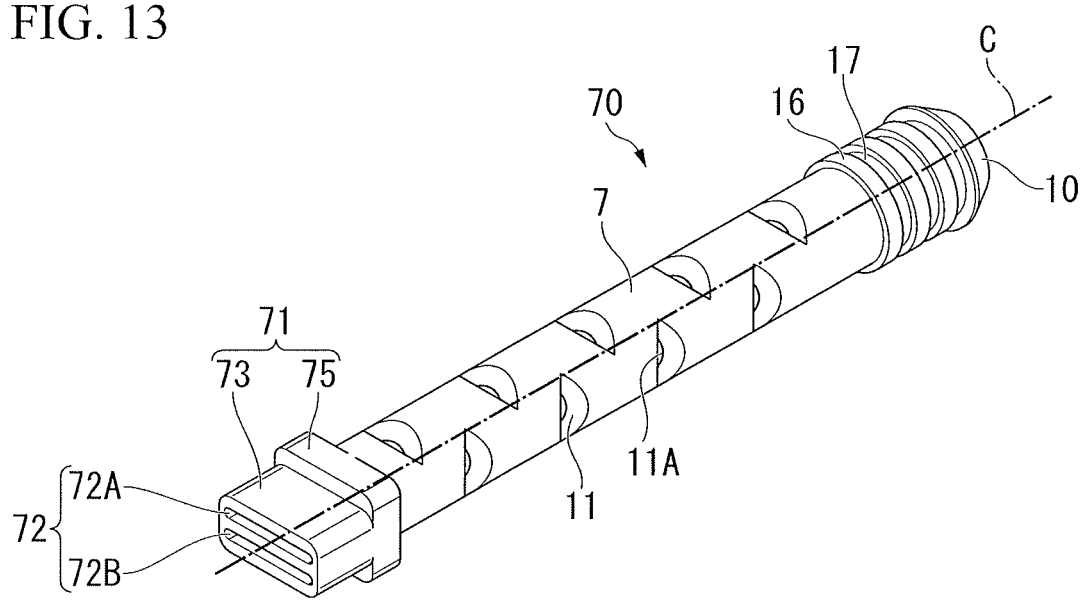
FIG. 13 is a perspective view showing a fourth embodiment of the optical connector boot according to the present invention.
Figure 14:
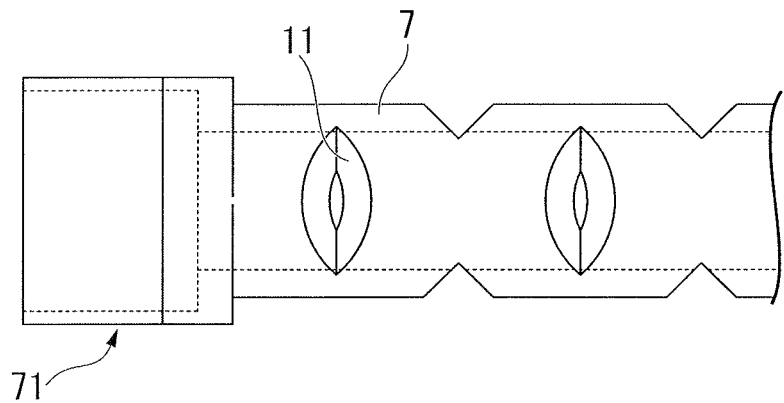
FIG. 14 is a main portion plan view of the optical connector boot shown in FIG. 13.
Figure 15:
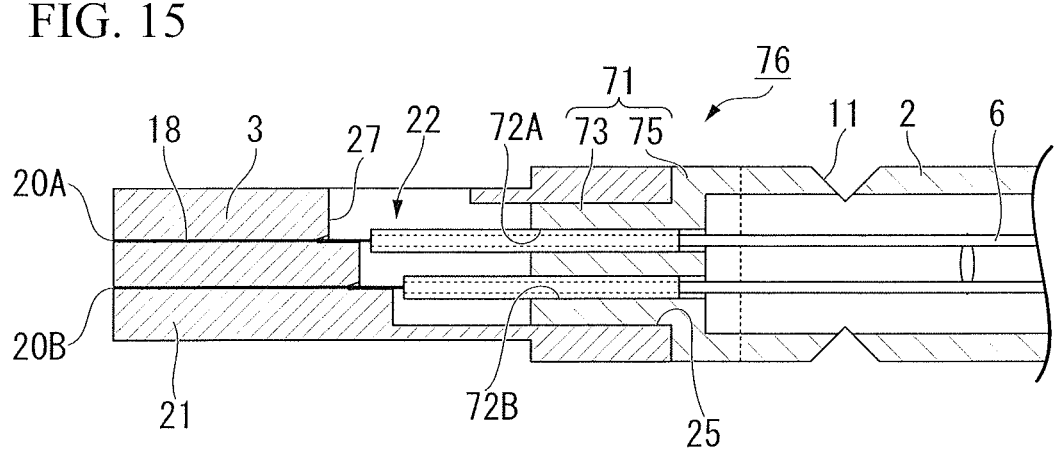
FIG. 15 is a main cross-section view of the connector attached optical fiber unit which uses the optical connector boot shown in FIG. 13.

Next, a fourth embodiment will be described with reference to FIGS. 13 to 15.

In addition, the same reference numerals are assigned to the same components as the above-described embodiments, and descriptions thereof are omitted.

Differences between the fourth embodiment and the first embodiment are that a front fiber hole 72 in a head portion 71 of an optical connector boot 70 according to the present embodiment is divided into a first front fiber hole 72A and a second front fiber hole 72B.

The first front fiber hole 72A and the second front fiber hole 72B are disposed in two stages to correspond to the first hole row 20A and the second hole row 20B disposed on the front wall portion 21 of the MT connector 3. The outlines of a front end insertion portion 73 and an abutting wall portion 75, and the specifications of the constituent members of the optical connector boot and a connector attached optical fiber unit 76 in which the optical connector boot is disposed are the same as those of the boot 2 and the connector attached optical fiber unit 1 according to the first embodiment.

According to the optical connector boot 70 and the connector attached optical fiber unit 76, even when specifications of eight cores are applied, effects similar to those in the boot 2 according to the first embodiment can be exerted.

In addition, the technical range of the present invention is not limited to the above-described embodiments, and various modifications may be applied within a scope which does not depart from the gist of the present invention.

For example, in the first embodiment, the notch portions 11 penetrate the side surfaces of the tubular body portion 7, and thus, the hole portions 11A are formed. However, the hole portions 11A may be disposed alone. Moreover, instead of the notch portion 11, a thin portion having a thinner thickness than other portions may be disposed.

In addition, in the fourth embodiment, the front fiber hole 72 is divided into the first front fiber hole 72A and the second front fiber hole 72B. However, the front fiber hole may be divided into three or more portions.

While preferred embodiments of the invention have been described and illustrated above, it should be understood that these are exemplary examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A connector attached optical fiber unit comprising:
an MT optical connector including a front end and a rear end opposed to the front end, the front end having a joining end surface, the rear end having a rear end surface and a hollow portion opened to the rear end surface;
a tubular boot including a ront end portion, a rear end portion opposed to the front end portion, and a tubular body portion extending between the front end portion and the rear end portion and having an inner hole, the front end portion is inserted and fixed to the hollow portion of the MT optical connector, the rear end portion having a tube attachment portion;
a protection tube being formed of a single piece and enveloping the tube attachment portion, wherein
the protection tube is disposed radially outside the tube attachment portion, wherein a radial direction of the tubular body portion is perpendicular to both a center axis direction of the tubular body portion and an azimuthal direction of the tubular body portion relative to the center axis direction, and the protection tube is directly attached to the tube attachment portion of the tubular boot, circumferentially surrounds a plurality of optical fibers, and extends flexibly with the plurality of optical fibers beyond the tubular boot from the rear end portion of the tubular boot, and the plurality of optical fibers being inserted and fixed to the MT optical connector and the plurality of optical fibers extending from the hollow portion are accommodated inside the tubular boot and the protection tube, wherein the front end portion of the tubular boot has a front hole communicating with the inner hole of the tubular body portion, the tubular body portion includes notch portions, which are recessed from an outer circumferential surface or an inner circumferential surface of the tubular body portion and are formed at intervals from each other at a plurality of locatioins in the center axis direction of the tubular body portion in plurality of circumferential locations including both sides of the tubular body portion in a right-left direction coincident with an interval direction of a pair of guide pin holes of the MT optical connector, wherein the notch portions are tapered, and a groove width fo the tapered notch portions decreases from the outer circumferential surface of the tubular body portion toward an inner side of the tubular body portion, the tubular boot further includes an abutting wall portion abutting the read end surface of the MT optical connector, which protrudes form both sides of the front end portion in an extension direction of the tubular boot in an up-down direction perpendicular to the right-left direction, the front hole has a flat cross-section extending in the right-left direction, the inner hole of the tubular body portion has a circular cross-section and has an inner diameter less than the width of the front hole in the right-left direction of the front hole, and an external circumference of a cross section of the tubular body portion perpendicular to the center axis of the tubular body portion measured immediately adjacent to the abutting wall portion in the center axis direction is smaller than a perimeter of the abutting wall portion perpendicular to the center axis of the turular body portion.

2. The connector attached optical fiber unit according to claim 1, wherein a tape-like portion which collectively coats a plurality of the optical fibers in a tape shape with a resin coating material is accommodated in the hollow portion of the MT optical connector, and a portion which extends from the tape-like portion of the optical fiber to the rear side is accommodated in the tubular body portion of the tubular boot and the protection tube.

3. The connector attached optical fiber unit according to claim 1, wherein the notch portions of the tubular boot are formed only on both sides in the boot right-left direction of the tubular body portion.

4. The connector attached optical fiber unit according to claim 1, wherein the tube attachment portion of the tubular boot includes a tubular wall portion continuous from the rear end of the tubular body portion, and a slipping-off prevention projection which protrudes from the outer circumferential surface of the tubular wall portion and increases the pull-out resistance of the protection tube into which the tubular wall portion is inserted with respect to the tubular wall portion.

5. The connector attached optical fiber unit according to claim 1, wherein the flat cross-sectional front fiber hole which has the right-left direction in the tubular boot as the cross-sectional longitudinal direction thereof is formed at a plurality of locations in the extension direction of the tubular body portion and in the up-down direction perpendicular to the right-left direction in the boot in the front end portion of the tubular boot.

6. The connector attached optical fiber unit according to claim 1, wherein the MT optical connector further includes a front wall portion comprising a plurality of holes that receive the plurality of inserted optical fibers, the plurality of holes extending from the hollow portion of the MT optical connector to the joining end surface and forming a plurality of rows, and the rows extending in the right-left direction.

7. The connector attached optical fiber unit according to claim 6, wherein a first portion of the front wall portion that comprises a first row of the plurality of rows protrudes farther toward the hollow portion in a front-rear direction than a second portion of the front wall portion that comprises a second row of the plurality of rows.

8. The connector attached optical fiber unit according to claim 7, wherein the first row of the plurality of rows is disposed below the second row of the plurality of rows in the up-down direction.

9. An optical connector boot attached to an MT optical connector, the MT optical connector including a front end and a rear end opposed to the front end, the front end having a joining end surface, the rear end having a rear end surface and a hollow portion opened to the rear end surface, the optical connector boot comprising:

a flexible tubular body portion into which a plurality of optical fibers are inserted;

a front end portion which is provided on a front side of the tubular body portion, and is inserted and fixed to a hollow portion opened to the rear end surface;

a tube attachment portion which is formed on a rear side of the tubular body portion and is inserted and directly fixed into a protection tube t hat envelops the tube attachment portion, wherein the protection tube is formed of a single piece and is disposed radially outside the tube attachment portion, wherein a radial direction of the tubular body portion is perpendicular to both a center axis direction of the tubular body portion and an azimuthal direction of the tubular body portion relative to the center axis direction, and the protection tube extends flexibly with the optical fibers beyond the tubular body portion from the rear ide of the tubular body portion and accommodates the optical fibers extending from the rear side of the tubular body portion by circumferentially surrounding the optical fibers; and an abutting wall portion abutting the rear end surface of the MT optical connector, which, protrudes from both sides of the front end portion in an extension direction of the tubular boot in an up-down direction perpendicular to the right-left direction in the boot, and abuts the rear end surface of the MT optical connector, wherein in the front end portion, a cross-sectional outline of the front end portion perpendicular to a center axis of the tubular body portion is formed in a rectangular shape, and a front hole which communicates with the front side of an inner hole of the tubular body portion is formed, the tubular body portion includes notch portions which are recessed from an outer circumferential surface or an inner circumferential surface of the tubular body portion and are formed at intervals from each other at a plurality of locations in the center axis direction of the tubular body portion in a plurality of circumferential locations including both sides in a right-left direction coincident with a cross-sectional longitudinal direction of t he front end portion of the tubular body portion, wherein the notch portions are tapered, and a groove width of the tapered notch portions decreases from the outer circumferential surface of the tubular body portion toward an inner side of the tubular body portion, the front hole has a flat cross-section extending in the right-left direction, the inner hole of the tubular body portion has a circular cross-section and has an inner diameter less than the width of the front hole in the right-left direction of the front hole, and an external circumference of a cross section of the tubular body portion perpendicular to the central axis of the tubular body portion measured immediately adjacent to the abutting wall portion in the center axis direction is smaller than a perimeter of the abutting wall portion.

10. The optical connector boot according to claim 9, wherein the notch portions of the boot are formed only on both sides in the boot right-left direction of the tubular body portion.

11. The optical connector boot according to claim 9, wherein the tube attachment portion of the boot includes a tubular wall portion continuous from the rear end of the tubular body portion, and a slipping-off prevention projection which protrudes from the outer circumferential surface of the tubular wall portion and increases the pull-out resistance of the protection tube into which the tubular wall portion is inserted with respect to the tubular wall portion.

12. The optical connector boot according to claim 9, wherein the flat cross-sectional front fiber hole which has the right-left direction in the boot as the cross-sectional longitudinal direction thereof is formed at a plurality of locations in the extension direction of the tubular body portion and in the up-down direction perpendicular to the right-left direction in the boot in the front end insertion portion.

13. The optical connector boot according to claim 9, wherein

The MT optical connector further includes a front wall portion comprising a plurality of holes that receive the plurality of inserted optical fibers, the plurality of holes extending from the hollow portion of the MT optical connector to the joining end surface and forming a plurality of rows, and the rows extending in the right-left direction.

14. The optical connector boot according to claim 13, wherein a first portion of the front wall portion that comprises a first row of the plurality of rows protrudes farther toward the hollow portion in a front-rear direction than a second portion of the front wall portion that comprises a second row of the plurality of rows.

15. The optical connector boot according to claim 14, wherein the first row of the plurality of rows is disposed below the second row of the plurality of rows in the up-down direction.

* * * * *